(12) United States Patent
Uchida et al.

(10) Patent No.: US 12,456,889 B2
(45) Date of Patent: Oct. 28, 2025

(54) ROTOR AND ROTATING ELECTRICAL MACHINE

(71) Applicant: KABUSHIKI KAISHA TOSHIBA, Tokyo (JP)

(72) Inventors: Hidenori Uchida, Mie Mie (JP); Masaru Kano, Yokkaichi Mie (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 196 days.

(21) Appl. No.: 18/325,935

(22) Filed: May 30, 2023

(65) Prior Publication Data

US 2023/0307969 A1 Sep. 28, 2023

Related U.S. Application Data

(63) Continuation of application No. PCT/JP2022/000822, filed on Jan. 13, 2022.

(51) Int. Cl.
*H02K 1/276* (2022.01)

(52) U.S. Cl.
CPC .................................. *H02K 1/276* (2013.01)

(58) Field of Classification Search
CPC ........ H02K 1/276; H02K 1/2766; H02K 1/27; H02K 1/274; Y02T 10/64
See application file for complete search history.

(56) References Cited

U.S. PATENT DOCUMENTS

| 9,793,770 B2 | 10/2017 | Takahashi |
| 2008/0231135 A1 | 9/2008 | Suzuki et al. |
| 2014/0077653 A1* | 3/2014 | Takahashi ............... H02K 1/274 |
| | | 310/156.53 |
| 2018/0254677 A1* | 9/2018 | Shibamori ............... H02K 1/27 |
| 2021/0083535 A1* | 3/2021 | Yoshinaga ............... H02K 1/16 |
| 2022/0209600 A1* | 6/2022 | Hisada ................... H02K 1/276 |

FOREIGN PATENT DOCUMENTS

| JP | 2005-130604 A | 5/2005 |
| JP | 5088587 B2 | 12/2012 |
| JP | 2014-60835 A | 4/2014 |
| JP | 2020-14322 A | 1/2020 |
| JP | 2020-78163 A | 5/2020 |
| JP | 6848135 B1 | 3/2021 |

OTHER PUBLICATIONS

European Patent Office, Extended European Search Report in EP App. No. 22908820.8 (Jul. 30, 2025).

* cited by examiner

*Primary Examiner* — Christopher M Koehler
*Assistant Examiner* — Ethan Nguyen Vo
(74) *Attorney, Agent, or Firm* — Finnegan, Henderson, Farabow, Garrett & Dunner, LLP (57) ABSTRACT

According to one embodiment, a rotor includes, for each magnetic pole of a rotor iron core, first and second outer circumferential side bridge portions, and first and second inner circumferential side bridge portions. The first and second outer circumferential side bridge portions are provided such that a mutual interval is decreased from an outer circumferential side of the rotor iron core to an inner circumferential side. The first and second inner circumferential side bridge portions are provided such that a mutual interval is decreased from the outer circumferential side of the rotor iron core to the inner circumferential side, and are connected to the first and second outer circumferential side bridge portions, respectively.

4 Claims, 4 Drawing Sheets

ROTOR AND ROTATING ELECTRICAL MACHINE

CROSS-REFERENCE TO RELATED APPLICATIONS

This application is a Continuation Application of PCT Application No. PCT/JP2022/000822, filed Jan. 13, 2022, the entire contents of which are incorporated herein by reference.

FIELD

Embodiments described herein relate generally to a rotor of a rotating electrical machine comprising a permanent magnet, and a rotating electrical machine comprising the rotor.

BACKGROUND

In recent years, permanent magnets with a high magnetic energy product have been developed by the remarkable research and development of permanent magnets. A permanent magnet type of rotating electrical machine using these permanent magnets has been applied as an electric motor or power generator of a train or vehicle. This rotating electrical machine comprises a cylindrical stator, and a columnar rotor rotatably supported inside the stator. The rotor comprises a rotor iron core, and a plurality of permanent magnets buried in the rotor iron core. These permanent magnets form a plurality of magnetic poles in the columnar direction of the rotor iron core.

In the above permanent magnet type of rotating electrical machine, it is important to sufficiently maintain the strength of the rotor iron core relative to a centrifugal force.

Embodiments described herein aim to provide a rotor and a rotating electrical machine which can sufficiently maintain the strength of a rotor iron core and avoid the irreversible demagnetization of a permanent magnet.

DETAILED DESCRIPTION

In general, according to one embodiment, a rotor comprises: a rotor iron core comprising a rotation center; a plurality of permanent magnets provided in the rotor iron core and forming a plurality of magnetic poles around the rotation center; first and second magnet accommodation areas provided in each of the magnetic poles of the rotor iron core, comprising end portions, respectively, provided so as to be spaced apart from each other in a circumferential direction of the rotor iron core at positions close to an outer circumferential surface of the rotor iron core, comprising other end portions, respectively, provided so as to be close to each other at positions spaced apart from the outer circumferential surface of the rotor iron core in a radial direction of the rotor iron core, and accommodating the respective permanent magnets; first and second outer circumferential side magnetic voids provided in each of the magnetic poles of the rotor iron core, being in contact with the end portions of the first and second magnet accommodation areas, respectively, and being open to outside of the rotor iron core through the outer circumferential surface of the rotor iron core; first and second inner circumferential side magnetic voids provided in each of the magnetic poles of the rotor iron core, and being in contact with the other end portions of the first and second magnet accommodation areas, respectively; an outer circumferential side center magnetic void and an inner circumferential side center magnetic void, these voids being provided in each of the magnetic poles of the rotor iron core, and located separately on an outer circumferential side and an inner circumferential side in the radial direction of the rotor iron core between the first and second inner circumferential side magnetic voids; first and second outer circumferential side bridge portions located, in each of the magnetic poles of the rotor iron core, between the first inner circumferential side magnetic void and the outer circumferential side center magnetic void and between the second inner circumferential side magnetic void and the outer circumferential side center magnetic void, respectively, provided such that a mutual interval is decreased from the outer circumferential side of the rotor iron core to the inner circumferential side, and connected to an area on the outer circumferential side relative to the first and second magnet accommodation areas, the first and second outer circumferential side magnetic voids, the first and second inner circumferential side magnetic voids and the outer circumferential side center magnetic void in the rotor iron core; first and second inner circumferential side bridge portions located, in each of the magnetic poles of the rotor iron core, between the first inner circumferential side magnetic void and the inner circumferential side center magnetic void and between the second inner circumferential side magnetic void and the inner circumferential side center magnetic void, respectively, provided such that a mutual interval is decreased from the outer circumferential side of the rotor iron core to the inner circumferential side, connected to the first and second outer circumferential side bridge portions, respectively, and connected to an area on the inner circumferential side relative to the first and second magnet accommodation areas, the first and second outer circumferential side magnetic voids, the first and second inner circumferential side magnetic voids and the inner circumferential side center magnetic void in the rotor iron core; a center bridge portion provided in each of the magnetic poles of the rotor iron core, located between the outer circumferential side center magnetic void and the inner circumferential side center magnetic void, and extending between a connection portion of the first outer circumferential side bridge portion and the first inner circumferential side bridge portion and a connection portion of the second outer circumferential side bridge portion and the second inner circumferential side bridge portion; a first permanent magnet retention protrusion portion provided in each of the magnetic poles of the rotor iron core, protruding from the connection portion of the first outer circumferential side bridge portion and the first inner circumferential side bridge portion to inside of the first inner circumferential side magnetic void, and facing the first magnet accommodation area; and a second permanent magnet retention protrusion portion provided in each of the magnetic poles of the rotor iron core, protruding from the connection portion of the second outer circumferential side bridge portion and the second inner circumferential side bridge portion to inside of the second inner circumferential side magnetic void, and facing the second magnet accommodation area. In the first outer circumferential side bridge portion, a portion of a boundary with the outer circumferential side center magnetic void includes a linear part which linearly extends. In the first inner circumferential side bridge portion, a portion of a boundary with the inner circumferential side center magnetic void includes a linear part which linearly extends. In the second outer circumferential side bridge portion, a portion of a boundary with the outer circumferential side center magnetic void includes a linear part which linearly extends. In the second inner circumferential side bridge portion, a portion of a boundary with the inner circumferential side center magnetic void includes a linear part which linearly extends. In the center bridge portion, a portion of a boundary with the inner circumferential side center magnetic void includes a linear part extending in a direction orthogonal to virtual straight lines including the linear parts of the first outer circumferential side bridge portion, the first inner circumferential side bridge portion, the second outer circumferential side bridge portion and the second inner circumferential side bridge portion. An intersection point between the virtual straight line including the linear part of the first outer circumferential side bridge portion and the virtual straight line including the linear part of the center bridge portion is provided at a position which is more distant from the first magnet accommodation area than an intersection point between the virtual straight line including the linear part of the first inner circumferential side bridge portion and the virtual straight line including the linear part of the center bridge portion. An intersection point between the virtual straight line including the linear part of the second outer circumferential side bridge portion and the virtual straight line including the linear part of the center bridge portion is provided at a position which is more distant from the second magnet accommodation area than an intersection point between the virtual straight line including the linear part of the second inner circumferential side bridge portion and the virtual straight line including the linear part of the center bridge portion.

According to another embodiment, a rotating electrical machine comprises the rotor and a stator which rotatably supports the rotor.

Embodiments of the present invention will be described hereinafter with reference to the accompanying drawings. Structures which are common to the embodiments are denoted by the same reference numbers, overlapping explanations being omitted. Each figure is an exemplary diagram of an embodiment to aid understanding of the embodiment. The shape, dimension, ratio or the like in the drawings may differ from those of the actual device, and may be appropriately changed in light of the following explanation and the known art.

Figure 1:
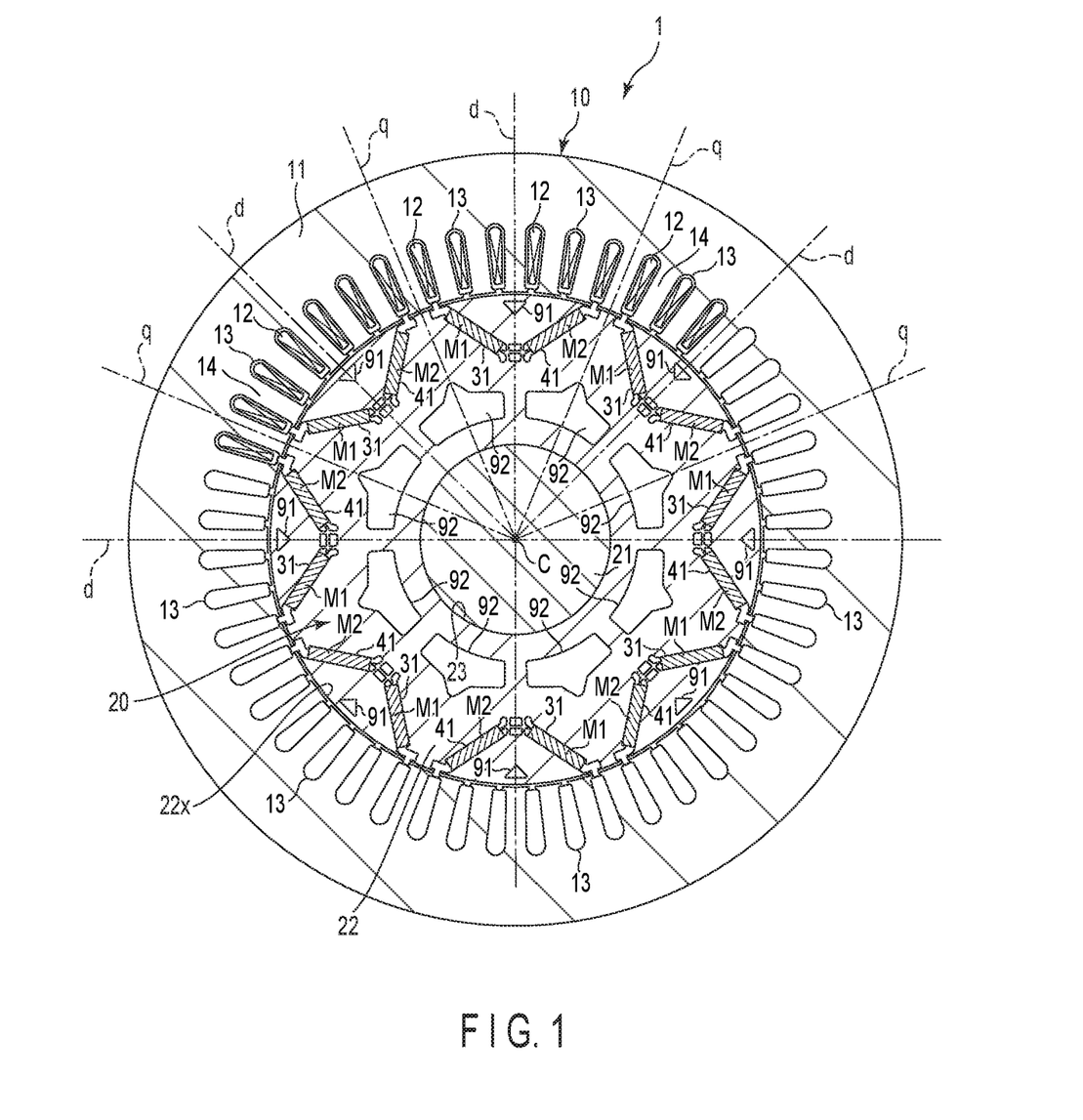
FIG. 1 is a transverse cross-sectional view of a permanent magnet type of rotating electrical machine according to an embodiment.
Figure 2:
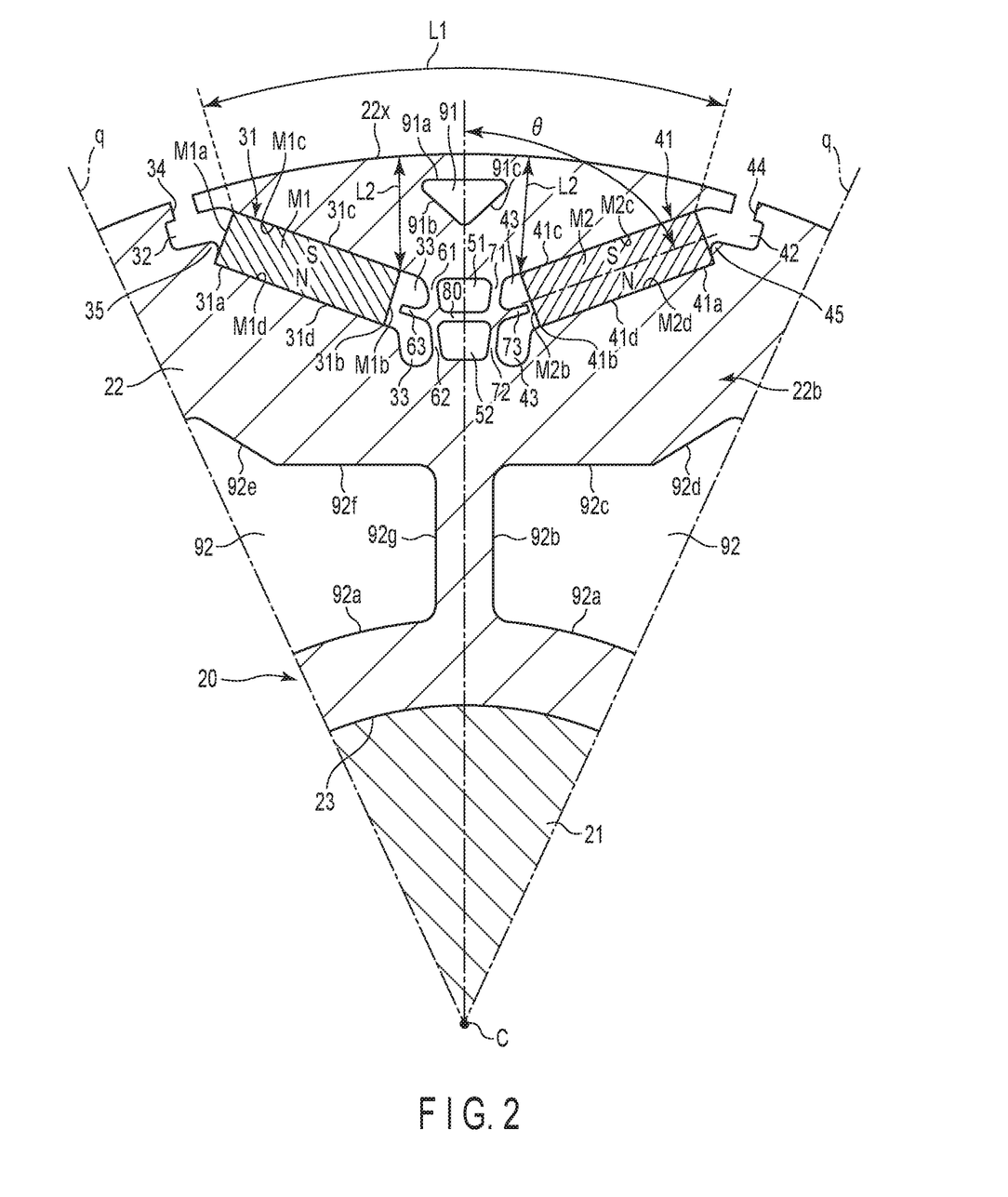
FIG. 2 is a transverse cross-sectional view showing part of a rotor iron core according to the embodiment.

FIG. 1 is a transverse cross-sectional view of a permanent magnet type of rotating electrical machine according to an embodiment. FIG. 2 is a cross-sectional view showing the portion of a magnetic pole of a rotor iron core according to the embodiment.

As shown in FIG. 1, a rotating electrical machine 1 is configured as, for example, an inner rotor type of rotating electrical machine, and includes an annular or cylindrical stator 10 supported in a fixing frame (not shown), and a rotor 20 comprising a central axis (rotation center) C and supported inside the stator 10 rotatably and coaxially with the stator 10. For example, the rotating electrical machine 1 is suitably applied to a drive motor or a power generator in a hybrid electric vehicle (HEV) or an electric vehicle (EV).

The stator 10 comprises a cylindrical stator iron core 11, and an armature winding (coil) 12 wound onto the stator iron core 11. The stator iron core 11 is structured by concentrically stacking a large number of annular electromagnetic steel plates (iron core pieces) formed of a magnetic material, for example, silicon steel. A plurality of slots 13 are formed in the inner circumferential portion of the stator iron core 11.

The slots 13 are arranged at regular intervals in the circumferential direction of the stator iron core 11. The slots 13 are open on the inner circumferential surface of the stator iron core 11 and extend in a radiation direction from the inner circumferential surface. Each slot 13 extends over the entire length of the stator iron core 11 in the axial direction of the stator iron core 11. As these slots 13 are formed, a plurality of (for example, 48) stator teeth 14 facing the rotor 20 are formed in the inner circumferential portion of the stator iron core 11. The armature windings 12 are inserted into the respective slots 13 and are wound onto the respective stator teeth 14. By supplying electricity to the armature windings 12, a predetermined flux linkage is formed in the stator 10 (stator teeth 14).

The rotor 20 comprises a columnar rotation shaft 21 in which both ends are rotatably supported by a bearing (not shown), a cylindrical rotor iron core 22 fixed to substantially the middle portion in the axial direction of the rotation shaft 21, and a plurality of permanent magnets M1 and a plurality of permanent magnets M2 buried in the rotor iron core 22. The rotor 20 is coaxially provided inside the stator 10 such that a tiny gap (air gap) is interposed between the rotor 20 and the inner circumferential surface of the stator 10. The outer circumferential surface of the rotor 20 faces the inner circumferential surface of the stator 10 across an intervening tiny gap. The rotor iron core 22 comprises an inner hole 23 formed coaxially with the central axis C. The rotation shaft 21 is inserted and fitted into the inner hole 23 and extends coaxially with the rotor iron core 22.

The rotor iron core 22 is structured as a stacked layer body prepared by concentrically stacking a large number of annular electromagnetic steel plates (iron core pieces) formed of a magnetic material, for example, silicon steel. The rotor iron core 22 comprises the above central axis C extending in the stacked direction of the iron core pieces, and an outer circumferential surface $22x$ facing the inner circumferential surface of the stator 10 across an intervening tiny gap (air gap).

The rotor iron core 22 comprises a plurality of magnetic poles, for example, eight magnetic poles. In the rotor iron core 22, an axis which passes through the central axis C and the boundary between magnetic poles adjacent in the circumferential direction and extends in the radial direction of the rotor iron core 22 is referred to as a q-axis. Further, an axis which is electrically spaced apart from each q-axis at 90° in the circumferential direction, in other words, a line which passes through the center in the circumferential direction of each magnetic pole from the central axis C and extends in the radial direction, is referred to as a d-axis. A direction in which a flux linkage formed by the stator 10 easily flows is a q-axis. These d-axis and q-axis are alternately provided in the circumferential direction of the rotor iron core 22 with a predetermined phase. The portion of a magnetic pole of the rotor iron core 22 refers to the area between two q-axes adjacent in the circumferential direction (the circumferential angle area of ⅛ of the circumference). The center in the circumferential direction of a magnetic pole is a d-axis.

As shown in FIG. 1 and FIG. 2, in each magnetic pole of the rotor iron core 22, magnet accommodation area (first magnet accommodation area) 31 which accommodates permanent magnet M1 and magnet accommodation area (second magnet accommodation area) 41 which accommodates permanent magnet M2 are provided at contrastive positions between which the d-axis is interposed.

Magnet accommodation areas 31 and 41 comprise end portions 31a and 41a provided so as to be a predetermined distance L1 distant from each other in the circumferential direction of the rotor iron core 22 at positions close to the outer circumferential surface 22x of the rotor iron core 22, and further comprise the other end portions 31b and 41b provided so as to be close to each other at positions a predetermined distance L2 distant from the outer circumferential surface 22x of the rotor iron core 22 in the radial direction of the rotor iron core 22, and are provided in substantially a V-shape such that the distance from the d-axis gradually extends from the inner circumferential side end to the outer circumferential side end. Angle θ of the inclination of magnet accommodation areas 31 and 41 with respect to the d-axis is less than 90°.

Magnet accommodation area 31 has a rectangular shape corresponding to the cross-sectional shape of permanent magnet M1 and is formed so as to penetrate the rotor iron core 22 in the axial direction. Magnet accommodation area 31 comprises rim 31c located on the outer circumferential side of the rotor iron core 22 and rim 31d located on the inner circumferential side of the rotor iron core 22 between an end portion 31a and the other end portion 31b. Permanent magnet M1 is accommodated in this magnet accommodation area 31. In association with this accommodation, nonpolar surfaces M1a and M1b which are the longitudinal both end portions of permanent magnet M1 correspond to the end portions 31a and 31b of magnet accommodation area 31, respectively, and polar surfaces M1c and M1d parallel to the longitudinal direction of permanent magnet M1 abut on rims 31c and 31d of magnet accommodation area 31, respectively. Permanent magnet M1 is fixed to the rotor iron core 22 by, for example, an adhesive.

Magnet accommodation area 41 has a rectangular shape corresponding to the cross-sectional shape of permanent magnet M2 and is formed so as to penetrate the rotor iron core 22 in the axial direction. Magnet accommodation area 41 comprises rim 41c located on the outer circumferential side of the rotor iron core 22 and rim 41d located on the inner circumferential side of the rotor iron core 22 between an end portion 41a and the other end portion 41b. Permanent magnet M2 is accommodated in this magnet accommodation area 41. In association with this accommodation, nonpolar surfaces M2a and M2b which are the longitudinal both end portions of permanent magnet M2 correspond to the end portions 41a and 41b of magnet accommodation area 41, respectively, and polar surfaces M2c and M2d parallel to the longitudinal direction of permanent magnet M2 abut on rims 41c and 41d of magnet accommodation area 41, respectively. Permanent magnet M2 is fixed to the rotor iron core 22 by, for example, an adhesive.

Permanent magnets M1 and M2 are formed into a long and thin plate shape in which the transverse section is rectangular, and have a length substantially equal to the axial length of the rotor iron core 22. Permanent magnets M1 and M2 may be configured by combining a plurality of axial separate magnets. In this case, permanent magnets M1 and M2 are formed such that the total length of the separate magnets is substantially equal to the axial length of the rotor iron core 22.

In each magnetic pole of the rotor iron core 22, outer circumferential side magnetic void (first outer circumferential side magnetic void) 32 which is in contact with an end portion 31a of magnet accommodation area 31 in a communicating state and outer circumferential side magnetic void (second outer circumferential side magnetic void) 42 which is in contact with an end portion 41a of magnet accommodation area 41 in a communicating state are provided.

Outer circumferential side magnetic void 32 is a magnetic void containing a nonmagnetic material such as air, and is open to the outside of the rotor iron core 22 through cut hole 34 formed on the outer circumferential surface 22x of the rotor iron core 22. Outer circumferential side magnetic void 42 is a magnetic void containing a nonmagnetic material such as air, and is open to the outside of the rotor iron core 22 through cut hole 44 formed on the outer circumferential surface 22x of the rotor iron core 22. These outer circumferential side magnetic voids 32 and 42 are formed so as to penetrate the rotor iron core 22 in the axial direction.

In each magnetic pole of the rotor iron core 22, inner circumferential side magnetic void (first inner circumferential side magnetic void) 33 which is in contact with the other end portion 31b of magnet accommodation area 31 in a communicating state and inner circumferential side magnetic void (second inner circumferential side magnetic void) 43 which is in contact with the other end portion 41b of magnet accommodation area 41 in a communicating state are provided.

Inner circumferential side magnetic void 33 is a magnetic void containing a nonmagnetic material such as air, and comprises rim 33a which extends from rim 31c of magnet accommodation area 31 to the d-axis, rim 33b which bends from rim 33a to the inner circumferential side, extends toward the inner hole 23 while inclining with respect to the d-axis such that the distance to the d-axis is gradually decreased and is connected to the protrusion portion 63 described later, rim 33c which extends from the protrusion portion 63 to the inner hole 23 while inclining with respect to the d-axis such that the distance to the d-axis is gradually decreased, rim 33d which faces the inner hole 23 while bending so as to return from rim 33c to the magnet accommodation area 31 side, rim 33e which extends from rim 33d to magnet accommodation area 31, and rim 33f which is connected to rim 31d of magnet accommodation area 31 from rim 33e, an is formed so as to penetrate the rotor iron core 22 in the axial direction.

Inner circumferential side magnetic void 43 is a magnetic void containing a nonmagnetic material such as air, and comprises rim 43a which extends from rim 41c of magnet accommodation area 41 to the d-axis, rim 43b which bends from rim 43a to the inner circumferential side, extends toward the inner hole 23 while inclining with respect to the d-axis such that the distance to the d-axis is gradually decreased and is connected to the protrusion portion 73 described later, rim 43c which extends from the protrusion portion 73 to the inner hole 23 while inclining with respect to the d-axis such that the distance to the d-axis is gradually decreased, rim 43d which faces the inner hole 23 while bending so as to return from rim 43c to the magnet accommodation area 41 side, rim 43e which extends from rim 43d to magnet accommodation area 41, and rim 43f which is connected to rim 41d of magnet accommodation area 41 from rim 43e, an is formed so as to penetrate the rotor iron core 22 in the axial direction.

Figure 3:
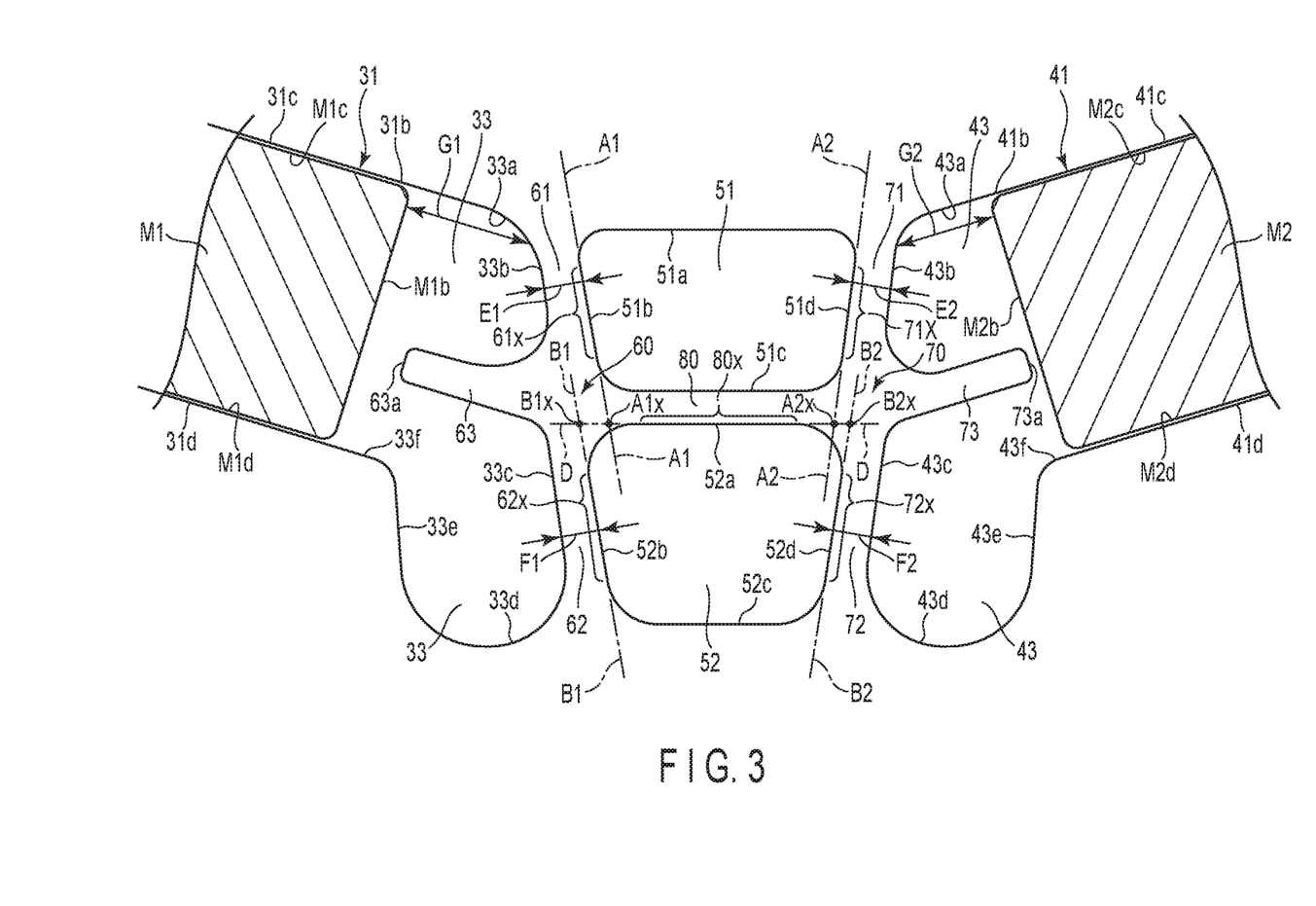
FIG. 3 is a diagram in which part of FIG. 2 is enlarged.

FIG. 2 and FIG. 3 show an example in which the shapes of the peripheral portions of inner circumferential side magnetic voids 33 and 43 are asymmetric such that they are slightly different from each other in the portions adjacent to the outer circumferential side portions 61 and 71 described later. The shapes of the peripheral portions of inner circumferential side magnetic voids 33 and 43 are not limited to the asymmetric shape and may be the same as each other.

In each magnetic pole of the rotor iron core 22, magnet retention protrusion 35 for holding permanent magnet M1 is provided between rim 31d on the end portion 31a side of magnet accommodation area 31 and outer circumferential side magnetic void 32. In each magnetic pole of the rotor iron core 22, magnet retention protrusion 45 for holding permanent magnet M2 is provided between rim 41d on the end portion 41a side of magnet accommodation area 41 and outer circumferential side magnetic void 42.

Outer circumferential side magnetic void 32 and inner circumferential side magnetic void 33 function as flux barriers which prevent a short-circuit of a magnetic flux (magnet magnetic flux) in the both end portions of permanent magnet M1 in magnet accommodation area 31 and also contribute to the reduction in the weight of the rotor iron core 22. Outer circumferential side magnetic void 42 and inner circumferential side magnetic void 43 function as flux barriers which prevent a short-circuit of a magnetic flux (magnet magnetic flux) in the both end portions of permanent magnet M2 in magnet accommodation area 41 and also contribute to the reduction in the weight of the rotor iron core 22.

Outer circumferential side magnetic voids 32 and 42 which are open to the outside of the rotor iron core 22 through cut holes 34 and 44 prevent a short-circuit of a magnet magnetic flux in the rotor iron core 22. In this way, the performance of the rotating electrical machine 1 is improved, and the size and weight of the rotating electrical machine 1 can be reduced.

In each magnetic pole of the rotor iron core 22, an outer circumferential side center magnetic void 51 and an inner circumferential side center magnetic void 52 are provided separately on the outer circumferential side and the inner circumferential side in the radial direction of the rotor iron core 22 between inner circumferential side magnetic voids 33 and 43.

Outer circumferential side center magnetic void 51 is a magnetic void containing a nonmagnetic material such as air, and has a trapezoidal shape consisting of rim 51a which faces the outer circumferential surface 22x and is orthogonal to the d-axis, rim 51b which faces rim 33b of inner circumferential side magnetic void 33 and inclines with respect to the d-axis such that the distance to the d-axis is decreased from the outer circumferential side to the inner circumferential side, rim 51c which faces the inner circumferential side center magnetic void 52 and is orthogonal to the d-axis, and rim 51d which faces rim 43b of inner circumferential side magnetic void 43 and inclines with respect to the d-axis such that the distance to the d-axis is decreased from the outer circumferential side to the inner circumferential side, and is formed so as to penetrate the rotor iron core 22 in the axial direction.

Inner circumferential side center magnetic void 52 is a magnetic void containing a nonmagnetic material such as air, and has a trapezoidal shape consisting of rim 52a which faces rim 51c of the inner circumferential side center magnetic void 51 and is orthogonal to the d-axis, rim 52b which faces rim 33c of inner circumferential side magnetic void 33 and inclines with respect to the d-axis such that the distance to the d-axis is decreased from the outer circumferential side to the inner circumferential side, rim 52c which faces the inner hole 23 and is orthogonal to the d-axis, and rim 52d which faces rim 43c of inner circumferential side magnetic void 43 and inclines with respect to the d-axis such that the distance to the d-axis is decreased from the outer circumferential side to the inner circumferential side, and is formed so as to penetrate the rotor iron core 22 in the axial direction.

In each magnetic pole of the rotor iron core 22, the pillar-shaped outer circumferential side bridge portion (first outer circumferential side bridge portion) 61 is formed between rim 33b of inner circumferential side magnetic void 33 and rim 51b of the outer circumferential side center magnetic void 51, and the pillar-shaped outer circumferential side bridge portion (second outer circumferential side bridge portion) 71 is formed between rim 43b of inner circumferential side magnetic void 43 and rim 51d of the outer circumferential side center magnetic void 51. These outer circumferential side bridge portions 61 and 71 incline with respect to the d-axis along the trapezoidal shape of the outer circumferential side center magnetic void 51 such that the interval between them is decreased from the outer circumferential side of the rotor iron core 22 to the inner circumferential side, and are connected to a sectoral area 22a on the outer circumferential side relative to magnet accommodation areas 31 and 41, outer circumferential side magnetic voids 32 and 42, inner circumferential side magnetic voids 33 and 43 and the outer circumferential side center magnetic void 51 in the rotor iron core 22. Area 22a is called an outer circumferential side iron core portion 22a.

Magnet accommodation areas 31 and 42, outer circumferential side magnetic voids 32 and 42, inner circumferential side magnetic voids 33 and 43 and the outer circumferential side center magnetic void 51 form a layer of flux barrier.

In each magnetic pole of the rotor iron core 22, a pillar-shaped inner circumferential side bridge portion (first inner circumferential side bridge portion) 62 is formed between rim 33c of inner circumferential side magnetic void 33 and rim 52b of the inner circumferential side center magnetic void 52, and a pillar-shaped inner circumferential side bridge portion (second inner circumferential side bridge portion) 72 is formed between rim 43c of inner circumferential side magnetic void 43 and rim 52d of the inner circumferential side center magnetic void 52. These inner circumferential side bridge portions 62 and 72 incline with respect to the d-axis along the trapezoidal shape of the inner circumferential side center magnetic void 52 such that the interval between them is decreased from the outer circumferential side of the rotor iron core 22 to the inner circumferential side, and are connected to outer circumferential side bridge portions 61 and 71, respectively, and are connected to area 22b on the inner circumferential side relative to magnet accommodation areas 31 and 41, outer circumferential side magnetic voids 32 and 42, inner circumferential side magnetic voids 33 and 43 and the inner circumferential side center magnetic void 52 in the rotor iron core 22. Area 22b on the inner circumferential side is called an inner circumferential side iron core portion 22b.

Since the sectoral outer circumferential side iron core portion 22a spaced apart from the inner circumferential side iron core portion 22b by cut holes 34 and 44 and magnet accommodation areas 31 and 41 is connected to the inner circumferential side iron core portion 22b by outer circumferential side bridge portions 61 and 71 and inner circumferential side bridge portions 62 and 72 connected to outer circumferential side bridge portions 61 and 71, even if a great centrifugal force is applied to the outer circumferential side iron core portion 22a, the outer circumferential side iron core portion 22a can be stably supported from the inner circumferential side iron core portion 22b side.

In each magnetic pole of the rotor iron core 22, a pillar-shaped center bridge portion 80 is formed between rim 51c of the outer circumferential side center magnetic void 51 and rim 52a of the inner circumferential side center magnetic void 52. This center bridge portion 80 extends between connection portion 60 of outer circumferential side bridge portion 61 and inner circumferential side bridge portion 62 and connection portion 70 of outer circumferential side bridge portion 71 and inner circumferential side bridge portion 72, and connects these connection portions 60 and 70.

Since outer circumferential side bridge portions 61 and 71 are provided in a trapezoidal shape such that the interval between them is gradually decreased from the outer circumferential side to the inner circumferential side, and inner circumferential side bridge portions 62 and 72 are provided in a trapezoidal shape such that the interval between them is gradually decreased from the outer circumferential side to the inner circumferential side, and further, connection portion 60 of outer circumferential side bridge portion 61 and inner circumferential side bridge portion 62 is connected to connection portion 70 of outer circumferential side bridge portion 71 and inner circumferential side bridge portion 72 by the center bridge portion 80, even if a great bending stress is applied to outer circumferential side bridge portions 61 and 71 and inner circumferential side bridge portions 62 and 72, the deformation of each bridge portion by the stress can be suppressed with sufficient strength.

Outer circumferential side bridge portion 61 includes linear part 61x which linearly extends with the same inclination as the inclination of outer circumferential side bridge portion 61 with respect to the d-axis in the boundary portion with the outer circumferential side center magnetic void 51 (rim 51b of the outer circumferential side center magnetic void 51). Inner circumferential side bridge portion 62 includes linear part 62x which linearly extends with the same inclination as the inclination of inner circumferential side bridge portion 62 with respect to the d-axis in the boundary portion with the inner circumferential side center magnetic void 52 (rim 52b of the inner circumferential side center magnetic void 52).

Outer circumferential side bridge portion 71 includes linear part 71x which linearly extends with the same inclination as the inclination of outer circumferential side bridge portion 71 with respect to the d-axis in the boundary portion with the outer circumferential side center magnetic void 51 (rim 51d of the outer circumferential side center magnetic void 51). Inner circumferential side bridge portion 72 includes linear part 72x which linearly extends with the same inclination as the inclination of inner circumferential side bridge portion 72 with respect to the d-axis in the boundary portion with the inner circumferential side center magnetic void 52 (rim 52d of the inner circumferential side center magnetic void 52).

The center bridge portion 80 includes linear part 80x which extends in a direction orthogonal to virtual straight lines A1, B1, A2 and B2 including linear parts 61x, 62x, 71x and 72x of outer circumferential side bridge portion 61, inner circumferential side bridge portion 62, outer circumferential side bridge portion 71 and inner circumferential side bridge portion 72, respectively, in the boundary portion with the inner circumferential side center magnetic void 52 (rim 52a of the inner circumferential side center magnetic void 52).

Intersection point A1x of virtual straight line A1 including linear part 61x of outer circumferential side bridge portion 61 and virtual straight line D including linear part 80x of the center bridge portion 80 is provided at a position which is more distant from magnet accommodation area 31 than intersection point B1x of virtual straight line B1 including linear part 62x of inner circumferential side bridge portion 62 and virtual straight line D including linear part 80x of the center bridge portion 80. Intersection point A2x of virtual straight line A2 including linear part 71x of outer circumferential side bridge portion 71 and virtual straight line D including linear part 80x of the center bridge portion 80 is provided at a position which is more distant from magnet accommodation area 41 than intersection point B2x of virtual straight line B2 including linear part 72x of inner circumferential side bridge portion 72 and virtual straight line D including linear part 80x of the center bridge portion 80.

Thus, in the circumferential direction of the rotor iron core 22, outer circumferential side bridge portion 61 is closer to the d-axis side than inner circumferential side bridge portion 62. As a result, distance G1 between the other end portion 31b of magnet accommodation area 31 and outer circumferential side bridge portion 61 is extended. As distance G1 between the other end portion 31b of magnet accommodation area 31 and outer circumferential side bridge portion 61 is extended, regarding the process of loading magnet accommodation area 31 with permanent magnet M1, magnet accommodation area 31 can be easily loaded with permanent magnet M1 without the interruption of outer circumferential side bridge portion 61. In this way, the workability is improved when the rotor 20 is manufactured.

In the circumferential direction of the rotor iron core 22, outer circumferential side bridge portion 71 is closer to the d-axis side than inner circumferential side bridge portion 72. As a result, distance G2 between the other end portion 41b of magnet accommodation area 41 and outer circumferential side bridge portion 71 is extended. As distance G2 is extended, regarding the process of loading magnet accommodation area 41 with permanent magnet M2, magnet accommodation area 41 can be easily loaded with permanent magnet M2 without the interruption of outer circumferential side bridge portion 71. In this respect, further, the workability is improved when the rotor 20 is manufactured.

Since connection portion 60 of outer circumferential side bridge portion 61 and inner circumferential side bridge portion 62 is connected to connection portion 70 of outer circumferential side bridge portion 71 and inner circumferential side bridge portion 72 by the center bridge portion 80, even if a great bending stress is applied to connection portions 60 and 70, the deformation of each bridge portion by the stress can be suppressed with sufficient strength.

Width E1 of outer circumferential side bridge portion 61 in the circumferential direction of the rotor iron core 22 is defined as the width between the portion of the boundary with inner circumferential side magnetic void 33 (rim 33b of inner circumferential side magnetic void 33) and the portion of the boundary with the outer circumferential side center magnetic void 51 (rim 51b of the outer circumferential side center magnetic void 51) in outer circumferential side bridge portion 61. Width F1 of inner circumferential side bridge portion 62 in the circumferential direction of the rotor iron core 22 is defined as the width between the portion of the boundary with inner circumferential side magnetic void 33 (rim 33c of inner circumferential side magnetic void 33) and the portion of the boundary with the inner circumferential side center magnetic void 52 (rim 52b of the inner circumferential side center magnetic void 52) in inner circumferential side bridge portion 62.

Width E2 of outer circumferential side bridge portion 71 in the circumferential direction of the rotor iron core 22 is defined as the width between the portion of the boundary with inner circumferential side magnetic void 43 (rim 43b of inner circumferential side magnetic void 43) and the portion of the boundary with the outer circumferential side center magnetic void 51 (rim 51d of the outer circumferential side center magnetic void 51) in outer circumferential side bridge portion 71. Width F2 of inner circumferential side bridge portion 72 in the circumferential direction of the rotor iron core 22 is defined as the width between the portion of the boundary with inner circumferential side magnetic void 43 (rim 43c of inner circumferential side magnetic void 43) and the portion of the boundary with the inner circumferential side center magnetic void 52 (rim 52d of the inner circumferential side center magnetic void 52) in inner circumferential side bridge portion 72.

Widths E1, F1, E2 and F2 of the bridge portions are set so as to be as less as possible such that the leak of a magnet magnetic flux is less. To sufficiently maintain the strength of each bridge portion for a great bending stress applied to each bridge portion, even if widths E1, F1, E2 and F2 of the bridge portions are set so as to be as less as possible, of outer circumferential side bridge portion 61 and inner circumferential side bridge portion 62, the least value of width F1 of inner circumferential side bridge portion 62 on the side to which a great bending stress is applied is set so as to be equal to or greater than the least value of width E1 of outer circumferential side bridge portion 61, and of outer circumferential side bridge portion 71 and inner circumferential side bridge portion 72, the least value of width F2 of inner circumferential side bridge portion 72 on the side to which a great bending stress is applied is set so as to be equal to or greater than the least value of width E2 of outer circumferential side bridge portion 71.

The width of the center bridge portion 80 in the radial direction of the rotor iron core 22 is set so as to be substantially equal to widths F1 and F2 of inner circumferential side bridge portions 62 and 72.

Figure 4:
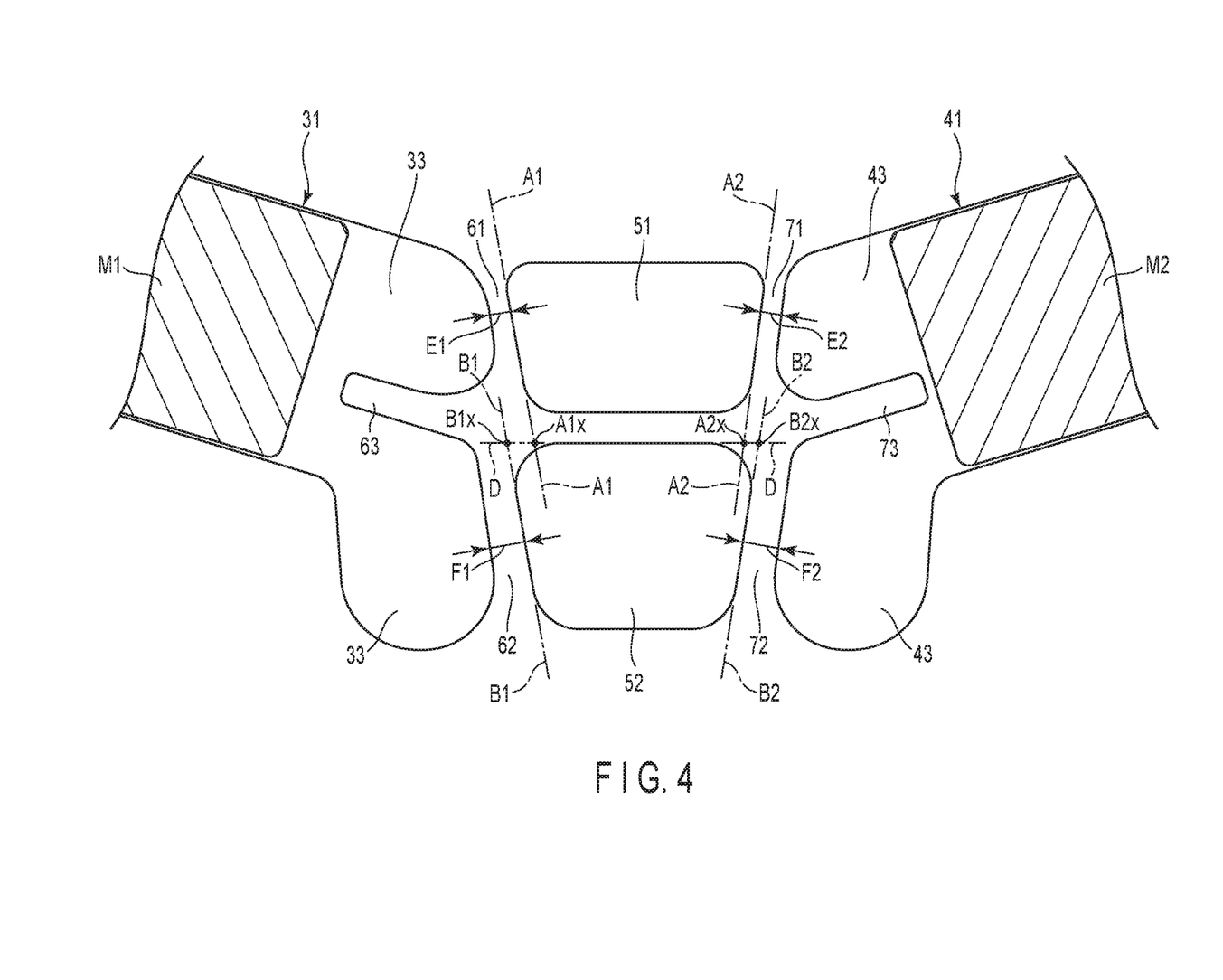
FIG. 4 is a diagram showing an example in which the width of a bridge portion in FIG. 3 differs.

The example of FIG. 2 and FIG. 3 shows a state in which the least value of width F1 of inner circumferential side bridge portion 62 is set so as to be substantially equal to the least value of width E1 of outer circumferential side bridge portion 61, and the least value of width F2 of inner circumferential side bridge portion 72 is set so as to be substantially equal to the least value of width E2 of outer circumferential side bridge portion 71. As shown in FIG. 4, the least value of width F1 of inner circumferential side bridge portion 62 may be configured to be set so as to be greater than the least value of width E1 of outer circumferential side bridge portion 61, and the least value of width F2 of inner circumferential side bridge portion 72 may be configured to be set so as to be greater than the least value of width E2 of outer circumferential side bridge portion 71.

[Permanent Magnet Retention Protrusion Portions 63 and 73]

In each magnetic pole of the rotor iron core 22, permanent magnet retention protrusion portion (first protrusion portion) 63 which protrudes from connection portion 60 of outer circumferential side bridge portion 61 and inner circumferential side bridge portion 62 to the inside of rims 33b and 33c of inner circumferential side magnetic void 33 is provided, and permanent magnet retention protrusion portion (second protrusion portion) 73 which protrudes from connection portion 70 of outer circumferential side bridge portion 71 and inner circumferential side bridge portion 72 to the inside of rims 43b and 43c of inner circumferential side magnetic void 43 is provided.

Protrusion portion 63 is provided to restrict the motion of permanent magnet M1 located inside magnet accommodation area 31, and extends in a pillar shape toward the other end portion 31b of magnet accommodation area 31 while inclining with respect to the d-axis at substantially the same angle as the inclination of magnet accommodation area 31 with respect to the d-axis, and distal end 63a faces nonpolar surface M1b of permanent magnet M1 located inside magnet accommodation area 31. Protrusion portion 73 is provided to restrict the motion of permanent magnet M2 located inside magnet accommodation area 41, and extends in a pillar shape toward the other end portion 41b of magnet accommodation area 41 while inclining with respect to the d-axis at substantially the same angle as the inclination of magnet accommodation area 41 with respect to the d-axis, and distal end 73a faces nonpolar surface M2b of permanent magnet M2 located inside magnet accommodation area 41. This discharge portion 73 restricts the motion of permanent magnet M2 located inside magnet accommodation area 41.

In FIG. 2 and FIG. 3, the shapes of protrusion portions 63 and 73 such as the lengths of protrusion portions 63 and 73 in the protrusion direction and the widths in a direction orthogonal to the protrusion direction may be the same as each other or may be different from each other.

When the rotor iron core 22 and permanent magnets M1 and M2 are heated to a high temperature by, for example, the high-load operation of the rotating electrical machine 1, a diamagnetic field by field-weakening control, etc., may be applied to the rotor iron core 22 from the stator 10.

In this case, the magnetic flux which passed through permanent magnet M1 and has a diamagnetic field may proceed to distal end 63a of permanent magnet retention protrusion portion 63. However, in outer circumferential side bridge portion 61 and inner circumferential side bridge portion 62 supporting protrusion portion 63, the magnet magnetic flux is saturated in the outer circumferential side end portion and the inner circumferential side end portion, thereby causing outer circumferential side bridge portion 61 and inner circumferential side bridge portion 62 to be in a clogged state, in other words, a high magnetoresistive state. Thus, it is possible to avoid a situation in which the magnetic flux which passed through permanent magnet M1 and has a diamagnetic field passes through outer circumferential side bridge portion 61 and inner circumferential side bridge portion 62 and flows into protrusion portion 63. Consequently, a problem in which a magnetic flux having a diamagnetic field passes through protrusion portion 63 and grazes permanent magnet M1 does not occur. Thus, it is possible to avoid irreversible demagnetization in permanent magnet M1. In this way, the performance of resistance to demagnetization in permanent magnet M1 is improved.

Similarly, the magnetic flux which passed through permanent magnet M2 and has a diamagnetic field may proceed to distal end 73a of permanent magnet retention protrusion portion 73. However, in outer circumferential side bridge portion 71 and inner circumferential side bridge portion 72 supporting protrusion portion 73, the outer circumferential side end portion and the inner circumferential side end portion are caused to be in a clogged state, in other words, a high magnetoresistive state, by the saturation of the magnet magnetic flux. Thus, it is possible to also avoid a situation in which the magnetic flux which passed through permanent magnet M2 and has a diamagnetic field passes through outer circumferential side bridge portion 71 and inner circumferential side bridge portion 72 and flows into protrusion portion 73. Consequently, a problem in which a magnetic flux having a diamagnetic field passes through protrusion portion 73 and grazes permanent magnet M2 does not occur. Thus, it is possible to avoid irreversible demagnetization in permanent magnet M2. In this way, the performance of resistance to demagnetization in permanent magnet M2 is improved.

As measures for irreversible demagnetization, permanent magnets M1 and M2 having a high coercive force may be adopted, or the thicknesses of permanent magnets M1 and M2 (the thickness between polar surfaces Ma and Mb) may be increased. However, these measures cause the increase in cost and in the size of the rotating electrical machine 1. In the present embodiment, irreversible demagnetization can be avoided without taking these measures. Thus, the problems of increasing the cost or the size of the rotating electrical machine 1 do not occur.

[Voids 91 and 92]

The rotor iron core 22 comprises void (cavity) 91 at a position close to the outer circumferential surface on the d-axis for each magnetic pole. The rotor iron core 22 comprises void (cavity) 92 extending over two magnetic poles at a position close to the inner hole 23 on the q-axis.

Each void 91 has a cross-sectional shape like substantially an isosceles triangle consisting of three rims 91a, 91b and 91c, and is formed over the entire length of the rotor iron core 24 in the axial direction. Of the three rims 91a, 91b and 91c forming each void 91, rim 91a equivalent to the base of the isosceles triangle is close to the outer circumferential surface 22x in a state orthogonal to the d-axis, and the remaining two rims 91b and 91c incline with respect to the d-axis so as to proceed to the d-axis while gradually moving away from the outer circumferential surface.

Each void 92 has a cross-sectional shape like a polygon consisting of seven rims 92a to 91g, and is formed over the entire length of the rotor iron core 22 in the axial direction. Of rims 92a to 91g which form each void 92, the greatest rim 92a faces the inner hole 23 in a state orthogonal to the q-axis, and two rims 92d and 92g which rise from both sides of rim 92a to the outer circumferential side face each other across the intervening d-axis, and two rims 92c and 92f continuous with these rims 92b and 92g extend toward the q-axis, and the remaining two rims 92d and 92e continuous with these rims 92c and 92f incline with respect to the d-axis so as to proceed to the q-axis while gradually approaching the outer circumferential surface 22x. Each void 92 is larger than each void 91. These voids 91 and 92 are the passage of a refrigerant (cooling oil), and also contribute to the reduction in the weight of the rotor iron core 22.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic poles, dimension, shape or the like of the rotor is not limited to the embodiments described above, and may be changed in various ways depending on the design. The number of permanent magnets in each magnetic pole of the rotor is not limited to two, and may be increased depending on the need. The number of first center bridges constituting the bridge is not limited to two, and may be three or more.

What is claimed is:

1. A rotor comprising:
    a rotor iron core comprising a rotation center;
    a plurality of permanent magnets provided in the rotor iron core and forming a plurality of magnetic poles around the rotation center;
    first and second magnet accommodation areas provided in each of the magnetic poles of the rotor iron core, comprising end portions, respectively, provided so as to be spaced apart from each other in a circumferential direction of the rotor iron core at positions close to an outer circumferential surface of the rotor iron core, comprising other end portions, respectively, provided so as to be close to each other at positions spaced apart from the outer circumferential surface of the rotor iron core in a radial direction of the rotor iron core, and accommodating the respective permanent magnets;
    first and second outer circumferential side magnetic voids provided in each of the magnetic poles of the rotor iron core, being in contact with the end portions of the first and second magnet accommodation areas, respectively, and being open to outside of the rotor iron core through the outer circumferential surface of the rotor iron core;
    first and second inner circumferential side magnetic voids provided in each of the magnetic poles of the rotor iron core, and being in contact with the other end portions of the first and second magnet accommodation areas, respectively;
    an outer circumferential side center magnetic void and an inner circumferential side center magnetic void, these voids being provided in each of the magnetic poles of the rotor iron core, and located separately on an outer circumferential side and an inner circumferential side in the radial direction of the rotor iron core between the first and second inner circumferential side magnetic voids;
    first and second outer circumferential side bridge portions located, in each of the magnetic poles of the rotor iron core, between the first inner circumferential side magnetic void and the outer circumferential side center magnetic void and between the second inner circumferential side magnetic void and the outer circumferential side center magnetic void, respectively, provided such that a mutual interval is decreased from the outer circumferential side of the rotor iron core to the inner circumferential side, and connected to an area on the outer circumferential side relative to the first and second magnet accommodation areas, the first and second outer circumferential side magnetic voids, the first and second inner circumferential side magnetic voids and the outer circumferential side center magnetic void in the rotor iron core;
    first and second inner circumferential side bridge portions located, in each of the magnetic poles of the rotor iron core, between the first inner circumferential side magnetic void and the inner circumferential side center magnetic void and between the second inner circumferential side magnetic void and the inner circumferential side center magnetic void, respectively, provided such that a mutual interval is decreased from the outer circumferential side of the rotor iron core to the inner circumferential side, connected to the first and second outer circumferential side bridge portions, respectively, and connected to an area on the inner circumferential side relative to the first and second magnet accommodation areas, the first and second outer circumferential side magnetic voids, the first and second inner circumferential side magnetic voids and the inner circumferential side center magnetic void in the rotor iron core;

a center bridge portion provided in each of the magnetic poles of the rotor iron core, located between the outer circumferential side center magnetic void and the inner circumferential side center magnetic void, and extending between a connection portion of the first outer circumferential side bridge portion and the first inner circumferential side bridge portion and a connection portion of the second outer circumferential side bridge portion and the second inner circumferential side bridge portion;

a first permanent magnet retention protrusion portion provided in each of the magnetic poles of the rotor iron core, protruding from the connection portion of the first outer circumferential side bridge portion and the first inner circumferential side bridge portion to inside of the first inner circumferential side magnetic void, and facing the first magnet accommodation area; and a second permanent magnet retention protrusion portion provided in each of the magnetic poles of the rotor iron core, protruding from the connection portion of the second outer circumferential side bridge portion and the second inner circumferential side bridge portion to inside of the second inner circumferential side magnetic void, and facing the second magnet accommodation area, wherein in the first outer circumferential side bridge portion, a portion of a boundary with the outer circumferential side center magnetic void includes a linear part which linearly extends, in the first inner circumferential side bridge portion, a portion of a boundary with the inner circumferential side center magnetic void includes a linear part which linearly extends, in the second outer circumferential side bridge portion, a portion of a boundary with the outer circumferential side center magnetic void includes a linear part which linearly extends, in the second inner circumferential side bridge portion, a portion of a boundary with the inner circumferential side center magnetic void includes a linear part which linearly extends, in the center bridge portion, a portion of a boundary with the inner circumferential side center magnetic void includes a linear part extending in a direction orthogonal to virtual straight lines including the linear parts of the first outer circumferential side bridge portion, the first inner circumferential side bridge portion, the second outer circumferential side bridge portion and the second inner circumferential side bridge portion, an intersection point between the virtual straight line including the linear part of the first outer circumferential side bridge portion and the virtual straight line including the linear part of the center bridge portion is provided at a position which is more distant from the first magnet accommodation area than an intersection point between the virtual straight line including the linear part of the first inner circumferential side bridge portion and the virtual straight line including the linear part of the center bridge portion, and an intersection point between the virtual straight line including the linear part of the second outer circumferential side bridge portion and the virtual straight line including the linear part of the center bridge portion is provided at a position which is more distant from the second magnet accommodation area than an intersection point between the virtual straight line including the linear part of the second inner circumferential side bridge portion and the virtual straight line including the linear part of the center bridge portion.

2. The rotor of claim 1, wherein
a least value of a width of the first inner circumferential side bridge portion in a circumferential direction of the rotor iron core is equal to or greater than a least value of a width of the first outer circumferential side bridge portion in the circumferential direction of the rotor iron core, and a least value of a width of the second inner circumferential side bridge portion in the circumferential direction of the rotor iron core is equal to or greater than a least value of a width of the second outer circumferential side bridge portion in the circumferential direction of the rotor iron core.

3. A rotating electrical machine comprising:
the rotor of claim 2; and
a stator which rotatably supports the rotor.

4. A rotating electrical machine comprising:
the rotor of claim 1; and
a stator which rotatably supports the rotor.

* * * * *